(12) United States Patent
Yamashita et al.

(10) Patent No.: US 11,300,135 B2
(45) Date of Patent: Apr. 12, 2022

(54) VARIABLE STATOR VANE AND COMPRESSOR

(71) Applicant: Mitsubishi Hitachi Power Systems, Ltd., Yokohama (JP)

(72) Inventors: Satoshi Yamashita, Tokyo (JP); Ryosuke Mito, Tokyo (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 0 days.

(21) Appl. No.: 16/767,777

(22) PCT Filed: Dec. 5, 2018

(86) PCT No.: PCT/JP2018/044707
§ 371 (c)(1),
(2) Date: May 28, 2020

(87) PCT Pub. No.: WO2019/116983
PCT Pub. Date: Jun. 20, 2019

(65) Prior Publication Data
US 2020/0378399 A1 Dec. 3, 2020

(30) Foreign Application Priority Data

Dec. 11, 2017 (JP) .............................. JP2017-237232

(51) Int. Cl.
*F01D 5/14* (2006.01)
*F04D 29/32* (2006.01)
(Continued)

(52) U.S. Cl.
CPC ......... *F04D 29/324* (2013.01); *F04D 29/563* (2013.01); *F01D 5/141* (2013.01);
(Continued)

(58) Field of Classification Search
CPC .... F04D 29/324; F04D 29/563; F04D 29/522; F01D 5/141; F01D 17/162; F05D 2240/121
See application file for complete search history.

(56) References Cited

U.S. PATENT DOCUMENTS 5,328,327 A     7/1994   Naudet
5,779,443 A *   7/1998   Haller ..................... F01D 5/145
                                                                                        415/191
(Continued)

FOREIGN PATENT DOCUMENTS

CN            1912353       2/2007
CN          206144858      5/2017
(Continued)

OTHER PUBLICATIONS

International Search Report dated Feb. 12, 2019 in International (PCT) Patent Application No. PCT/JP2018/044707, with English Translation.

(Continued)

*Primary Examiner* — Michael Lebentritt
*Assistant Examiner* — Brian Christopher Delrue
(74) *Attorney, Agent, or Firm* — Wenderoth, Lind & Ponack, L.L.P.

(57) ABSTRACT

A variable stator vane includes: a stator vane body which includes a radial end surface forming a clearance between the radial end surface and an outer peripheral surface of an inner casing; a rotation shaft which is rotatable so that an angle of the stator vane body with respect to a flow direction of a main stream of a working fluid is varied and which is connected to the radial end surface; and a curved surface portion which is formed on a vane surface adjacent to the radial end surface protruding radially outward from a circumference of the rotation shaft. A curvature radius of the (Continued)

curved surface portion is gradually decreased with distance away from the rotation shaft.

11 Claims, 9 Drawing Sheets

(51) Int. Cl.
    *F04D 29/56*     (2006.01)
    *F01D 17/16*     (2006.01)
    *F04D 29/52*     (2006.01)

(52) U.S. Cl.
    CPC .......... *F01D 17/162* (2013.01); *F04D 29/522* (2013.01); *F05D 2240/121* (2013.01); *F05D 2240/303* (2013.01); *F05D 2240/304* (2013.01)

(56) References Cited

U.S. PATENT DOCUMENTS

| | | | | |
|---|---|---|---|---|
| 7,063,509 | B2* | 6/2006 | Snook | F01D 5/141 |
| | | | | 416/189 |
| 9,631,504 | B2* | 4/2017 | Bentley | F01D 5/143 |
| 2004/0081548 | A1* | 4/2004 | Zess | F04D 29/544 |
| | | | | 415/1 |
| 2005/0036890 | A1* | 2/2005 | Tomberg | F01D 5/147 |
| | | | | 416/192 |
| 2005/0106025 | A1* | 5/2005 | Snook | F01D 5/225 |
| | | | | 416/189 |
| 2007/0020092 | A1 | 1/2007 | Giaimo et al. | |
| 2008/0101935 | A1* | 5/2008 | Clouse | F04D 29/563 |
| | | | | 416/193 A |
| 2012/0114458 | A1* | 5/2012 | Dutka | F04D 29/164 |
| | | | | 415/1 |
| 2015/0285085 | A1* | 10/2015 | Bentley | F01D 9/02 |
| | | | | 415/208.1 |
| 2016/0024971 | A1 | 1/2016 | Pearce et al. | |
| 2016/0265551 | A1* | 9/2016 | Bailey | F04D 29/522 |
| 2017/0191367 | A1 | 7/2017 | Sak et al. | |

FOREIGN PATENT DOCUMENTS

| | | |
|---|---|---|
| JP | 2008-115855 | 5/2008 |
| JP | 2012-102728 | 5/2012 |
| JP | 2012-233424 | 11/2012 |

OTHER PUBLICATIONS

Written Opinion of the International Searching Authority dated Feb. 12, 2019 in International (PCT) Patent Application No. PCT/JP2018/044707, with English Translation.

* cited by examiner

VARIABLE STATOR VANE AND COMPRESSOR

TECHNICAL FIELD

The present invention relates to a variable stator vane and a compressor.

Priority is claimed on Japanese Patent Application No. 2017-237232, filed Dec. 11, 2017, the content of which is incorporated herein by reference.

BACKGROUND ART

Among compressors, one including a rotor body accommodated in a casing, a plurality of rotor blades radially arranged on the outside of the rotor body in the radial direction and a plurality of variable stator vanes alternately arranged with the rotor blades in the extension direction of the rotor body is known.

Patent Document 1 discloses a variable stator vane which includes a stator vane body having a pressure surface and a negative pressure surface, a first shaft portion (a first rotation shaft), and a second shaft portion (a second rotation shaft). The stator vane body is disposed between an inner casing and an outer casing.

The first shaft portion is connected to one end of the stator vane body. The first shaft portion is supported by the inner casing so as to be swingable. The second shaft portion is connected to the other end of the stator vane body. A second blade shaft is supported by the outer casing so as to be swingable.

When the variable stator vane with such a configuration is applied to a compressor, a clearance is formed between an outer peripheral surface of the inner casing and one end surface of the stator vane body and between an inner peripheral surface of the outer casing and the other end surface of the stator vane body.

CITATION LIST

Patent Document

Patent Document 1: Japanese Unexamined Patent Application, First Publication No. 2012-233424

SUMMARY OF INVENTION

Technical Problem

Incidentally, in the variable stator vane with such a configuration, a pressure difference generated between the negative pressure surface and the positive pressure surface at a middle area between a leading edge and a trailing edge of the stator vane body is high. For this reason, there is a problem in that a leakage flow is generated from the clearance portion so that a flow of a fluid flowing in the vicinity of the first and second shaft portions (hereinafter, referred to as the "rotation shaft") is disturbed. Further, since the side surface of the rotation shaft directly faces the flow of main stream of the clearance portion, there is a problem that a large pressure loss is caused.

In this way, when the flow of the fluid is disturbed in the rotation shaft, the flow of the corner portion separates toward the edge of the stator vane body. As a result, there is a possibility that the pressure loss may further increase.

Here, an object of the present invention is to provide a variable stator vane and a compressor capable of preventing an occurrence of pressure loss.

Solution to Problem

In order to solve the above-described problems, a variable stator vane according to an aspect of the present invention includes: a stator vane body which is disposed in a flow path allowing a working fluid to flow therethrough and which includes a vane surface connecting two edges and a radial end surface forming a clearance between the radial end surface and a peripheral surface of a casing; a first rotation shaft which is rotatable so that an angle of the stator vane body with respect to a flow direction of a main stream of the working fluid is varied and which is connected to the radial end surface of the stator vane body; and a curved surface portion which is formed on the vane surface adjacent to the radial end surface protruding radially outward from a circumference of the first rotation shaft, wherein a curvature radius of the curved surface portion is gradually decreased with distance away from the first rotation shaft.

According to the present invention, since the variable stator vane is provided with the curved surface portion formed on the vane surface adjacent to the radial end surface protruding radially outward from the circumference of the first rotation shaft, the disturbance of the flow of the working fluid can be suppressed by the curved surface portion disposed close to the first rotation shaft in which a large pressure difference is generated on the vane surface.

Further, since the curvature radius of the curved surface portion is gradually decreased with distance away from the first rotation shaft, it is possible to allow the working fluid on the exit side of the variable stator vane to flow smoothly along the curved surface portion while preventing an increase in amount of the leakage flow occurred in the vicinity of the first rotation shaft.

Thus, since the variable stator vane is provided with the curved surface portion, an occurrence of pressure loss can be suppressed while preventing an increase in amount of a leakage flow.

Further, in the variable stator vane according to an aspect of the present invention, it may be such that the first rotation shaft includes a connection surface to which the radial end surface is connected, a fillet portion which is connected to the stator vane body to the first rotation shaft is provided between the vane surface and the connection surface, an end portion of the fillet portion is formed so as to extend outward from of the connection surface and an outer surface of the end portion of the fillet portion is as a first curved surface, at least part of a corner portion of the stator vane body which is formed so as to define the radial end surface located between the end portion of the fillet portion and the edge of the stator vane body is as a second curved surface reaching the end portion of the fillet portion and a curvature radius of the second curved surface is smaller than that of the first curved surface, and the curved surface portion includes the first curved surface and the second curved surface.

In this way, since the curved surface portion is formed of a part of the fillet portion having the first curved surface and the second curved surface formed in the corner portion of the radial end surface, wherein a curvature radius of the second curved surface is smaller than that of the first curved surface, an occurrence of pressure loss can be suppressed while preventing an increase in amount of a leakage flow.

Further, in the variable stator vane according to an aspect of the present invention, it may be such that the vane surface includes a negative pressure surface and a positive pressure surface, and the curved surface portion is formed close to the negative pressure surface.

In this way, even when the curved surface portion is disposed only on the blade surface located close to the negative pressure surface, an occurrence of pressure loss can be suppressed while preventing an increase in amount of a leakage flow.

Further, in the variable stator vane according to an aspect of the present invention, it may be such that the vane surface includes a negative pressure surface and a positive pressure surface, and the curved surface portion is formed close to the positive pressure surface.

In this way, even when the curved surface portion is disposed only in the blade surface located close to the positive pressure surface, an occurrence of pressure loss can be suppressed while preventing an increase in amount of a leakage flow.

Further, in the variable stator vane according to an aspect of the present invention, it may be such that the vane surface includes a negative pressure surface and a positive pressure surface, and the curved surface portion is formed close to each of the negative pressure surface and the positive pressure surface.

In this way, since the curved surface portion is disposed on each of the blade surface located close to the positive pressure surface and the blade surface located close to the negative pressure surface, an occurrence of pressure loss can be remarkably suppressed while preventing an increase in amount of the leakage flow.

Further, in the variable stator vane according to an aspect of the present invention, it may be such that the casing is provided with a shaft housing which is exposed from the peripheral surface of the casing and within which the first rotation shaft is accommodated, the shaft housing includes a first portion which is exposed from the peripheral surface, and a second portion which is integrally formed with the first portion and which is disposed at a position further away from the peripheral surface than the first portion, the first rotation shaft includes a recessed curved surface facing the first portion, the first portion is shaped such that a diameter of the first portion is increased from the second portion toward the peripheral surface of the casing, and the first portion includes an inclined surface which is inclined at a certain angle, a first chamfered portion which is formed between the inclined surface and an inner peripheral surface of the second portion and which is protruded in a direction toward the recessed curved surface, and a second chamfered portion which is formed between the peripheral surface and the inclined surface and which is protruded in a direction toward the recessed curved surface.

In this way, since the first portion which is exposed from the peripheral surface of the casing in the shaft housing includes the inclined surface which is inclined at a predetermined angle, the first chamfered portion which is formed between the inclined surface and the inner peripheral surface of the second portion and protrudes toward the curved portion, and the second chamfered portion which is formed between the peripheral surface of the casing and the inclined surface and protrudes toward the curved portion, a gap formed between the end of the curved portion located in the axial direction of the first rotation shaft and the first and second chamfered portions can be reduced. Accordingly, a leakage flow from being occurred between the casing and the curved portion can be suppressed.

Further, a compressor according to an aspect of the present invention includes: the above mentioned variable stator vane; a rotor including a rotor body and a plurality of rotor blades arranged in an axial direction and a circumferential direction of the rotor body; an inner casing which is provided on the outside of the rotor; an outer casing which is provided on the outside of the inner casing; and a rotational drive unit which is connected to the first rotation shaft and configured to rotate the first rotation shaft, wherein the casing is at least one of the inner casing and the outer casing.

According to the compressor with such a configuration, since the compressor is provided with the variable stator vane, an occurrence of pressure loss can be suppressed while preventing an increase in amount of a leakage flow.

Further, in the compressor according to an aspect of the present invention, it may be such that the first rotation shaft is supported by the inner casing so as to be rotatable, and the variable stator vane further comprises a second rotation shaft which is connected to the stator vane body located opposite to the first rotation shaft and which is supported by the outer casing so as to be rotatable.

Also in the compressor with such a configuration, an occurrence of pressure loss can be suppressed while preventing an increase in amount of a leakage flow.

Further, in the compressor according to an aspect of the present invention, it may be such that the curved surface portion is also disposed on the vane surface located close to the second rotation shaft.

Also in the compressor with such a configuration, an occurrence of pressure loss can be suppressed while preventing an increase in amount of a leakage flow.

Advantageous Effects of Invention

According to the present invention, an occurrence of pressure loss can be suppressed.

DESCRIPTION OF EMBODIMENTS

Hereinafter, embodiments of the present invention will be described in detail with reference to the drawings.

First Embodiment

Figure 1:
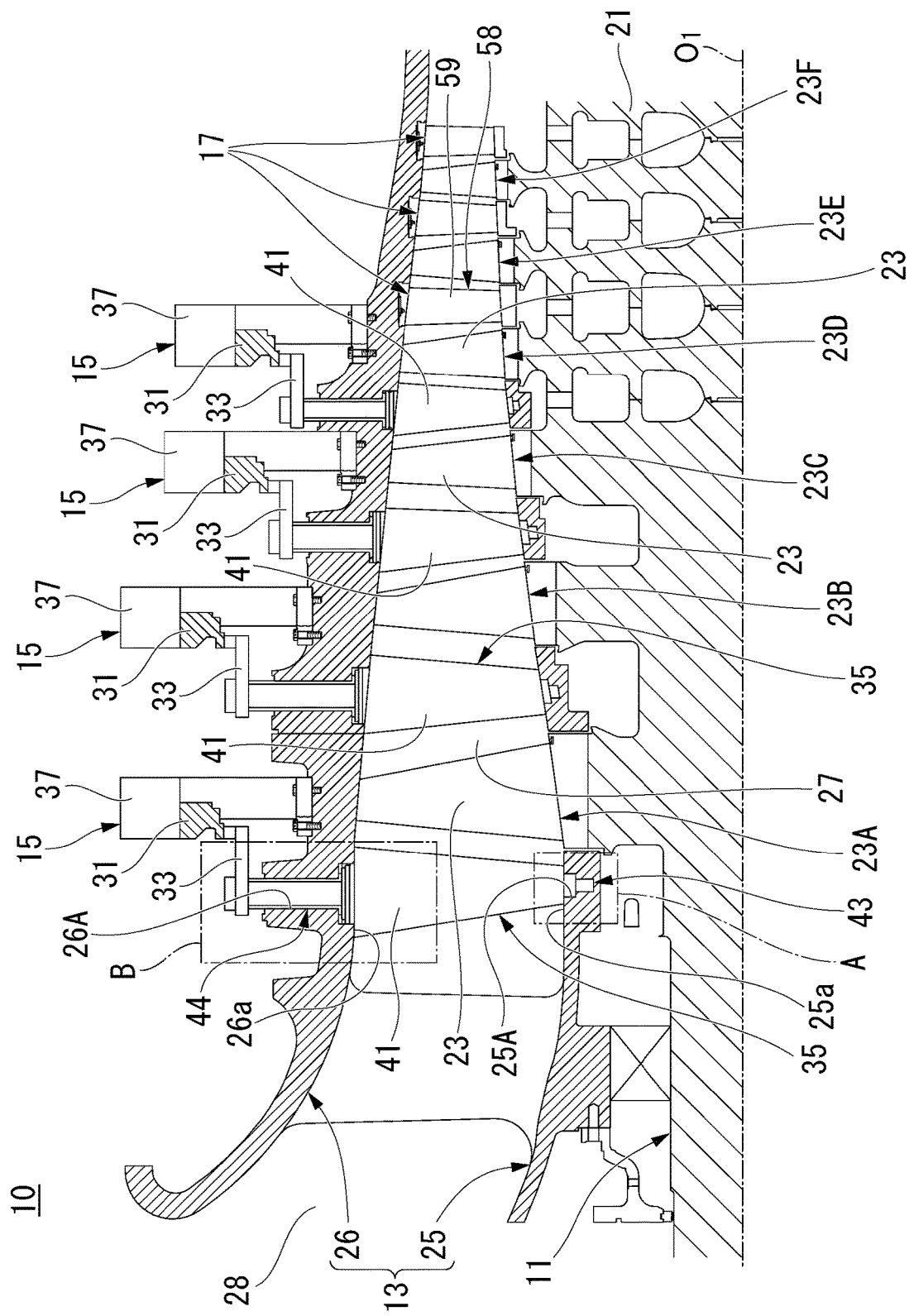
FIG. 1 is a cross-sectional view of a main part (an upper half part close to a suction portion) of a compressor according to a first embodiment of the present invention.

A compressor 10 according to a first embodiment will be described with reference to FIG. 1 to FIG. 3. In FIG. 1, an axial compressor is shown as an example of the compressor 10. In FIG. 1, only a casing 13 and a rotor 11 are shown in cross-section. In FIG. 1, A indicates an area (hereinafter, referred to as an "area A"), B indicates an area (hereinafter, referred to as an "area B"), and $O_1$ indicates an axis of the rotor 11 (hereinafter, referred to as an "axis $O_1$").

Figure 2:
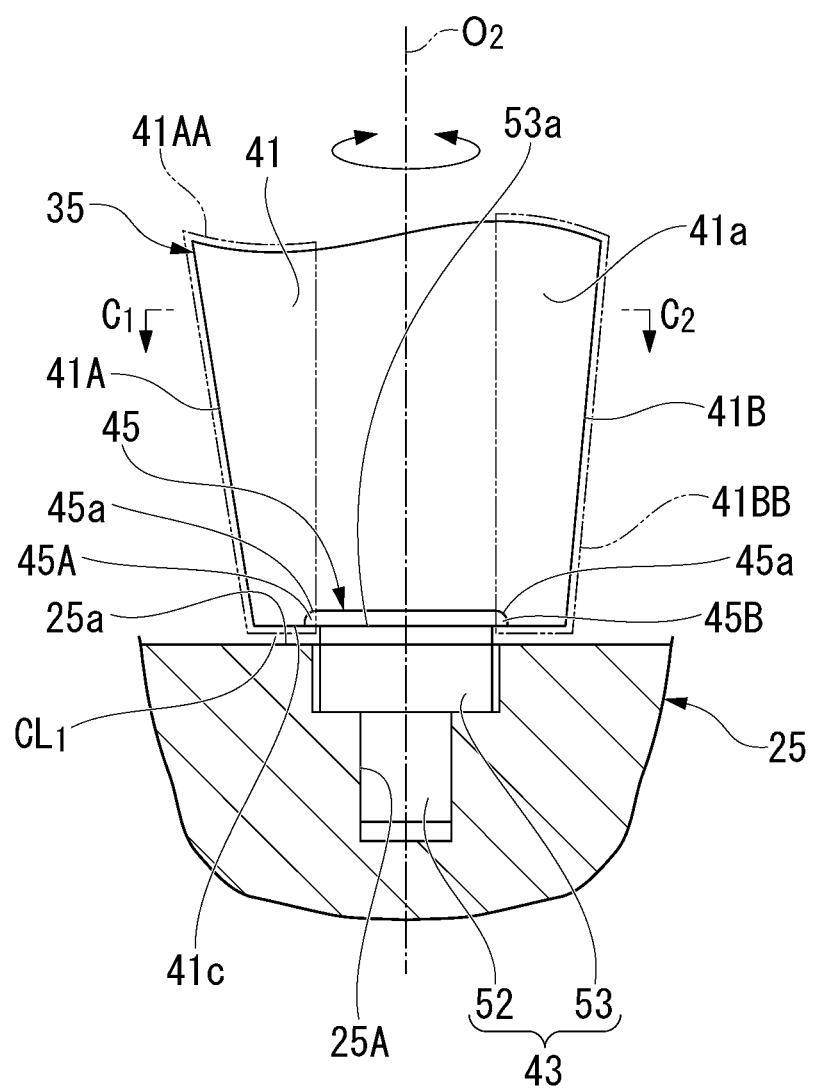
FIG. 2 is an enlarged cross-sectional view of a part surrounded by an area A in the compressor shown in FIG. 1.
Figure 8:
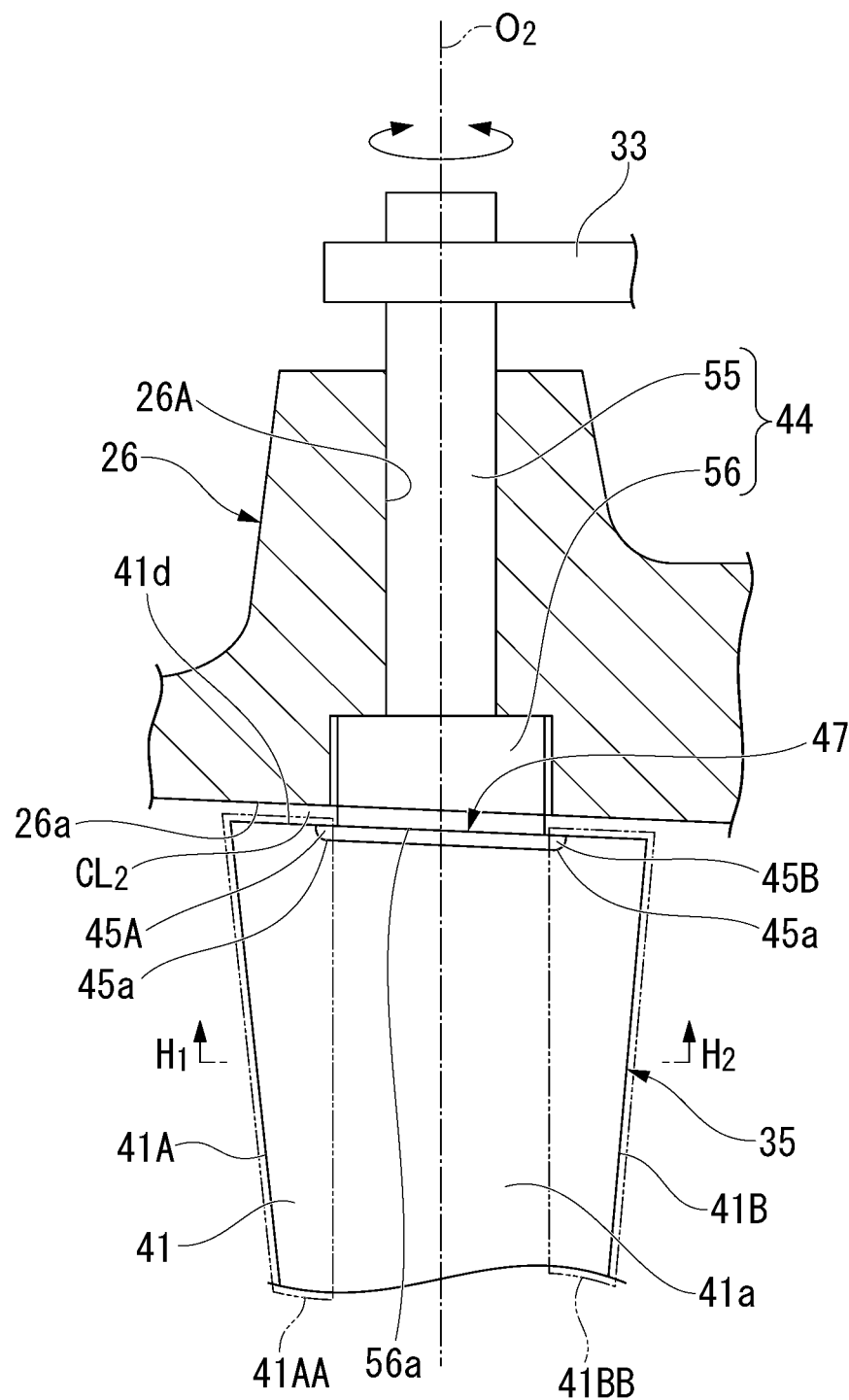
FIG. 8 is an enlarged cross-sectional view of a part surrounded by an area B in the compressor shown in FIG. 1.
Figure 9:
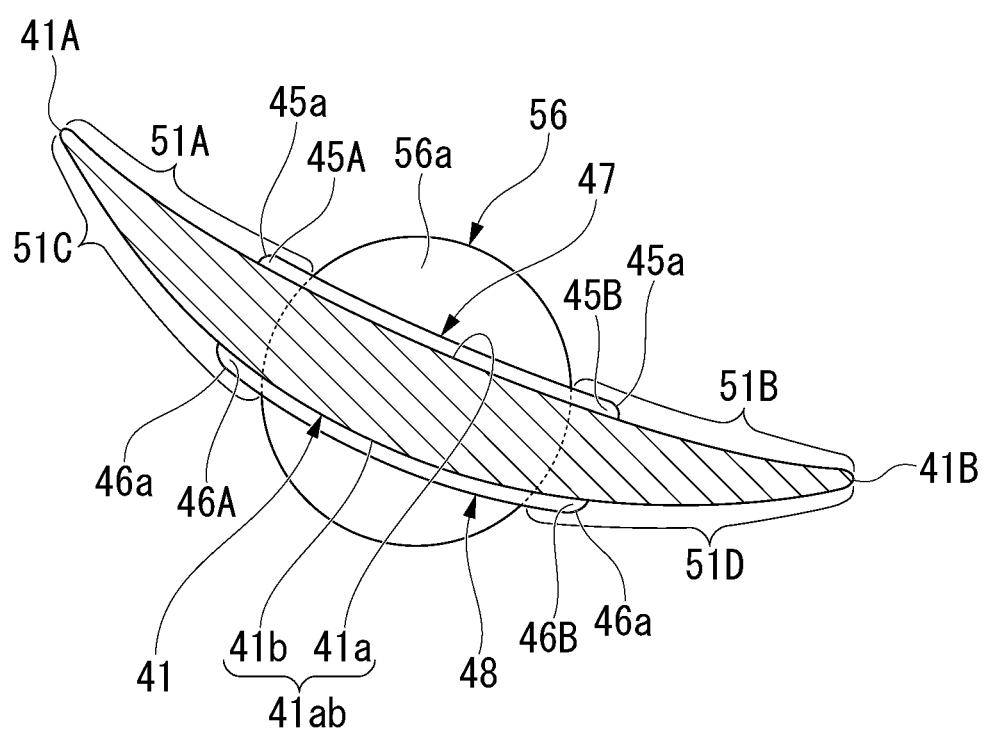
FIG. 9 is a cross-sectional view of the structure shown in FIG. 8 when taken along a line $H_1$-$H_2$.

Further, since it is difficult to show the clearance $CL_1$ shown in FIG. 2 and the clearance $CL_2$ shown in FIG. 8 in FIG. 1, these are omitted.

Figure 3:
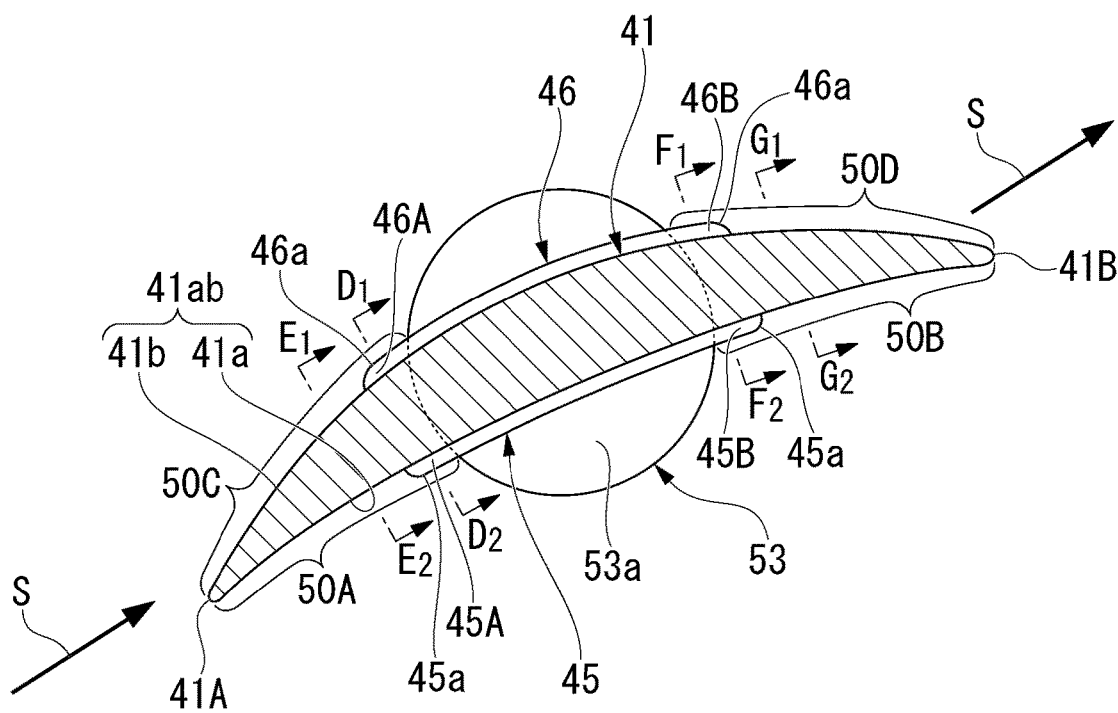
FIG. 3 is a cross-sectional view of a structure shown in FIG. 2 when taken along a line $C_1$-$C_2$.

In FIG. 2 and FIG. 3, $O_2$ indicates an axis of each of rotation shafts 43 and 44 (hereinafter, referred to as an "axis $O_2$"). S shown in FIG. 3 indicates a flow direction of a main stream of a working fluid (hereinafter, referred to as an "S direction"). In FIG. 1 to FIG. 3, the same components are denoted by the same reference numerals.

The compressor 10 includes the rotor 11, the casing 13, a plurality of variable stator vane mechanisms 15, and a plurality of stator vane rows 17.

The rotor 11 includes a rotor body 21, a plurality of rotor blades 23, and first to sixth rotor blade rows 23A to 23F including the plurality of rotor blades 23.

The rotor body 21 is a columnar member and extends in one direction. The rotor body 21 has a configuration in which a plurality of rotor disks (not shown) are layered. The rotor body 21 is rotatably supported by a bearing (not shown).

The plurality of rotor blades 23 are provided for each of the plurality of rotor disks. The plurality of rotor blades 23 respectively provided in the rotor disks are arranged in the circumferential direction and radially extend from the outer peripheral surface of the rotor disk.

Among the plurality of rotor disks, a first rotor disk which is disposed at a position closest to a suction port 28 of the compressor 10 is provided with a first rotor blade row 23A. The first rotor blade row 23A includes the plurality of rotor blades 23 which are arranged in the circumferential direction of the first rotor disk.

A second rotor blade row 23B is provided in a second rotor disk disposed close to a discharge side of the first rotor disk. The third rotor blade row 23C, the fourth rotor blade row 23D, the fifth rotor blade row 23E, and the sixth rotor blade row 23F are sequentially provided close to a discharge side of the second rotor disk at predetermined intervals in a direction from the suction port 28 toward the discharge port.

Although only the first to sixth rotor blade rows 23A to 23F are shown in FIG. 1 for the sake of space, the plurality of rotor blades rows are arranged in the direction of the axis $O_1$ also on the discharge side of the sixth rotor blade row 23F.

The casing 13 includes an inner casing 25 and an outer casing 26.

The inner casing 25 is a cylindrical member that is disposed on the outside of the rotor 11. The inner casing 25 includes a shaft housing 25A which accommodates the rotation shaft 43 of a variable stator vane 35 constituting the variable stator vane mechanism 15. A plurality of the shaft housings 25A are provided in the circumferential direction and the direction of the axis $O_1$ of the inner casing 25. The inner casing 25 supports one end side of the variable stator vane 35 while the rotation shaft 43 is rotatable.

The outer casing 26 is a cylindrical member that is disposed on the outside of the inner casing 25. The outer casing 26 includes a shaft housing 26A accommodating the rotation shaft 44 of the variable stator vane 35 constituting the variable stator vane mechanism 15. A plurality of the shaft housings 26A are provided in the circumferential direction and the direction of the axis $O_1$ of the outer casing 26.

The outer casing 26 supports the other end side of the variable stator vane 35 while the rotation shaft 44 is rotatable. A cylindrical flow path 27 is defined between the outer casing 26 and the inner casing 25.

The casing 13 includes the suction port 28 and the discharge port (not shown). The suction port 28 is provided on one side of the axis $O_1$. The suction port 28 communicates with the flow path 27. The suction port 28 sucks a working fluid (for example, external air) into the casing 13.

The discharge port is provided on the other side of the axis $O_1$. The discharge port communicates with the flow path 27. The discharge port discharges the working fluid compressed inside the casing 13 to the outside of the casing 13.

The plurality of variable stator vane mechanisms 15 are respectively provided close to the suction port 28 with respect to the first to fourth rotor blade rows 23A to 23D.

Here, a configuration of the variable stator vane mechanism 15 will be described with reference to FIG. 1 and FIG. 2. In FIG. 2, the same components as those of the structure shown in FIG. 1 are denoted by the same reference numerals.

The variable stator vane mechanism 15 is provided at a plurality of positions (four as an example in the case of FIG. 1) in the direction of the axis $O_1$ so as to be away from each other.

The variable stator vane mechanism 15 includes a movable ring 31, a plurality of mechanical linkages 33, the plurality of variable stator vanes 35, and a rotational drive unit 37.

The movable ring 31 is an annular member. The movable ring 31 is provided on the outside of the casing 13 so as to surround the casing 13.

The plurality of mechanical linkages 33 are arranged at predetermined intervals in the circumferential direction of the movable ring 31. In the plurality of mechanical linkages 33, one end is fixed to the movable ring 31. In the plurality of mechanical linkages 33, the other end protrudes toward the suction port 28.

Figure 4:
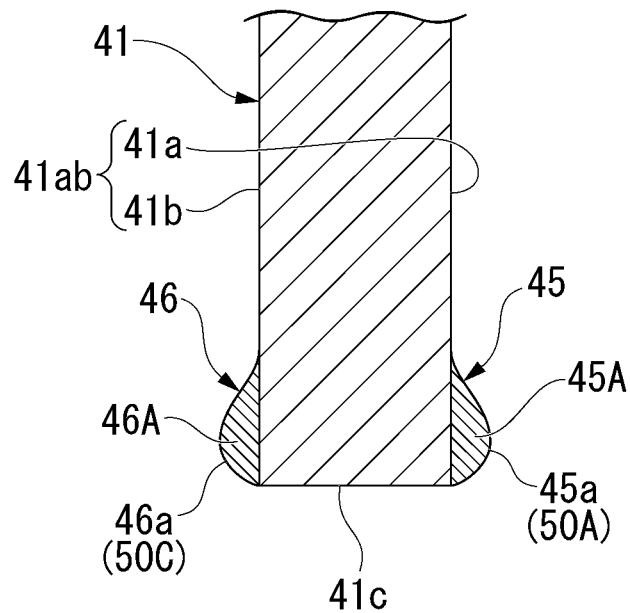
FIG. 4 is a cross-sectional view of the structure shown in FIG. 3 when taken along a line $D_1$-$D_2$.
Figure 5:
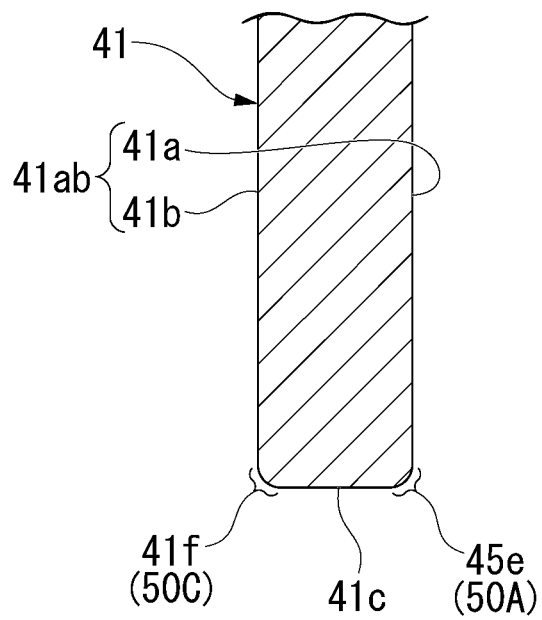
FIG. 5 is a cross-sectional view of the structure shown in FIG. 3 when taken along a line $E_1$-$E_2$.
Figure 6:
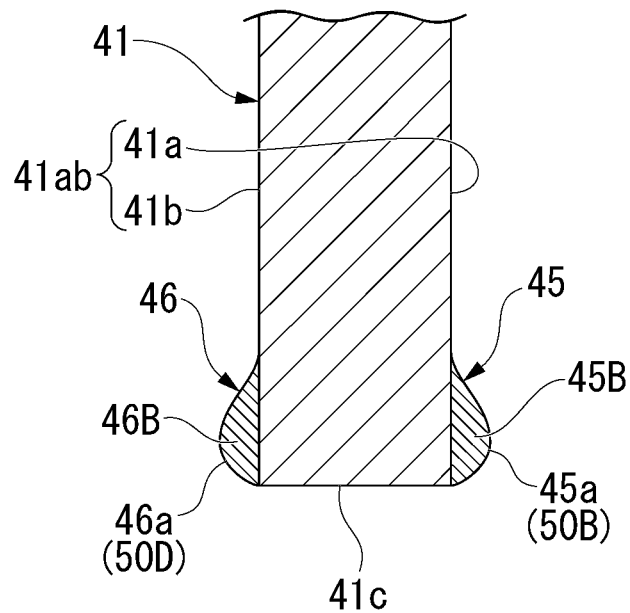
FIG. 6 is a cross-sectional view of the structure shown in FIG. 3 when taken along a line $F_1$-$F_2$.
Figure 7:
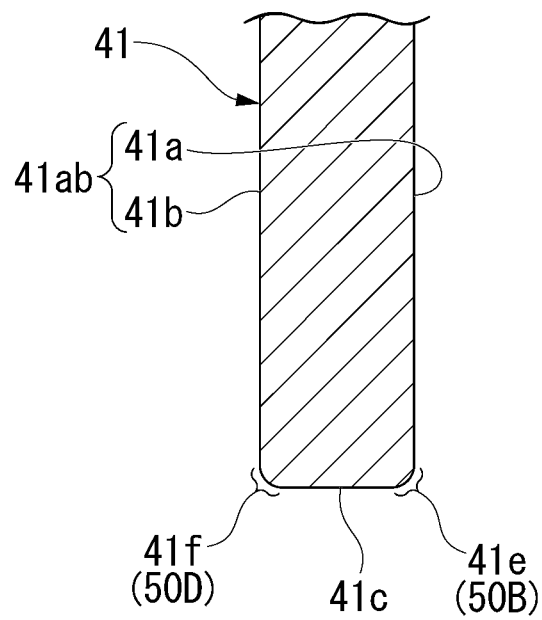
FIG. 7 is a cross-sectional view of the structure shown in FIG. 3 when taken along a line $G_1$-$G_2$.

The variable stator vane 35 will be described with reference to FIG. 1 to FIG. 7. Regarding FIG. 4 and FIG. 5, in FIG. 4, the same components as those of the structure shown in FIG. 1 to FIG. 3 are denoted by the same reference numerals. In FIG. 5, the same components as those of the structure shown in FIG. 4 are denoted by the same reference numerals. In FIGS. 1 to 7, the same components are denoted by the same reference numerals.

The variable stator vane 35 includes a stator vane body 41, the rotation shafts 43 and 44, fillet portions 45 to 48, and curved surface portions 50A to 50D and 51A to 51D. The stator vane body 41 is a member having an airfoil shape. The stator vane body 41 is disposed in the flow path 27 through which a working fluid flows.

The stator vane body 41 includes a leading edge 41A and a trailing edge 41B which are two edges, a positive pressure surface 41a and a negative pressure surface 41b which are vane surfaces 41ab, and radial end surfaces 41c and 41d.

The leading edge 41A is formed between the positive pressure surface 41a and the negative pressure surface 41b. The trailing edge 41B is formed between the positive pressure surface 41a and the negative pressure surface 41b. The positive pressure surface 41a and the negative pressure surface 41b are curved surfaces.

A pressure difference generated between the positive pressure surface 41a and the negative pressure surface 41b is largest at a middle area between the leading edge 41A and the trailing edge 41B than the other area, and is gradually decreased as close to the leading edge 41A or the trailing edge 41B.

The radial end surface 41c is disposed on one end of the stator vane body 41 in the direction of the axis $O_2$ (close to the inner casing 25). The middle portion of the radial end surface 41c is connected to the rotation shaft 43.

In the stator vane body 41, a leading edge side portion 41AA located close to the leading edge 41A and a trailing edge side portion 41BB located close to the trailing edge 41B are disposed so as to protrude radially outward the rotation shaft 43.

Accordingly, the radial end surface 41c of the leading edge side portion 41AA and the radial end surface 41c of the trailing edge side portion 41BB face the outer peripheral surface 25a of the inner casing 25 (the peripheral surface of the casing).

A clearance $CL_1$ is formed between each of the radial end surface 41c of the leading edge side portion 41AA and the radial end surface 41c of the trailing edge side portion 41BB and the outer peripheral surface 25a of the inner casing 25.

The radial end surface 41d is disposed on the other end of the stator vane body 41 in the direction of the axis $O_2$ (close to the outer casing 26). The middle portion of the radial end surface 41d is connected to the rotation shaft 44.

The radial end surface 41d of the leading edge side portion 41AA and the radial end surface 41d of the trailing edge side portion 41BB face the inner peripheral surface 26a of the outer casing 26 (the peripheral surface of the casing).

A clearance $CL_2$ is formed between each of the radial end surface 41d of the leading edge side portion 41AA and the radial end surface 41d of the trailing edge side portion 41BB and the inner peripheral surface 26a of the outer casing 26.

The rotation shaft 43 includes a rotation shaft body 52 and an enlarged diameter portion 53. The rotation shaft body 52 is a columnar member that extends in the direction of the axis $O_2$. An end portion of the rotation shaft body 52 close to the stator vane body 41 is protruded from the outer peripheral surface 25a of the inner casing 25, and the remaining portion of the rotation shaft body 52 is accommodated in the shaft housing 25A.

The rotation shaft 43 is rotated so as to change the angle of the stator vane body 41 with respect to the flow direction (S direction) of the main stream of the working fluid.

The enlarged diameter portion 53 is integrated with the rotation shaft body 52. The enlarged diameter portion 53 is disposed between the stator vane body 41 and the rotation shaft body 52 in the direction of the axis $O_2$. The enlarged diameter portion 53 has a diameter larger than the outer diameter of the rotation shaft body 52.

The enlarged diameter portion 53 includes a connection surface 53a connected to the middle portion of the radial end surface 41c of the stator vane body 41.

Next, the rotation shaft 44 will be described with reference to FIG. 8. In FIG. 8, the same components as those of the structure shown in FIG. 1 to FIG. 7 are denoted by the same reference numerals.

The rotation shaft 44 includes a rotation shaft body 55 and an enlarged diameter portion 56. The rotation shaft body 55 is a columnar member that extends in the direction of the axis $O_2$. An end portion of the rotation shaft body 55 close to the stator vane body 41 is protruded from the inner peripheral surface 26a of the outer casing 26, and the remaining portion of the rotation shaft body 55 is accommodated in the shaft housing 26A.

The enlarged diameter portion 56 is integrated with the rotation shaft body 55. The enlarged diameter portion 56 is disposed between the stator vane body 41 and the rotation shaft body 55 in the direction of the axis $O_2$. The enlarged diameter portion 56 has a diameter larger than the outer diameter of the rotation shaft body 52.

The enlarged diameter portion 56 includes a connection surface 56a connected to the middle portion of the radial end surface 41d of the stator vane body 41.

Next, the fillet portion 45 will be described with reference to FIG. 3 to FIG. 7. The fillet portion 45 is provided (in a boundary portion) between the positive pressure surface 41a and the connection surface 53a. The fillet portion 45 connects the positive pressure surface 41a of the stator vane body 41 to the enlarged diameter portion 53.

The fillet portion 45 is extended in a direction along the positive pressure surface 41a. The fillet portion 45 includes an end portion 45A disposed close to the leading edge 41A and an end portion 45B disposed close to the trailing edge 41B.

Each of the end portions 45A and 45B is disposed on the positive pressure surface 41a which is located on the outside of the connection surface 53a and in the vicinity of the radial end surface 41c. Each of the end portions 45A and 45B includes a first curved surface 45a which is an outer surface.

The first curved surface 45a is formed so that its curvature radius is gradually decreased with distance away from the enlarged diameter portion 53.

The fillet portion 46 is provided (in a boundary portion) between the negative pressure surface 41b and the connection surface 53a and connects the negative pressure surface 41b of the stator vane body 41 to the enlarged diameter portion 53.

The fillet portion 46 is extended in a direction along the negative pressure surface 41b. The fillet portion 46 includes an end portion 46A disposed close to the leading edge 41A and an end portion 46B disposed close to the trailing edge 41B.

Each of the end portions 46A and 46B is disposed on the negative pressure surface 41b which is located on the outside of the connection surface 53a and in the vicinity of the radial end surface 41c. Each of the end portions 46A and 46B includes a first curved surface 46a as an outer surface.

The first curved surface 46a is formed so that its curvature radius is gradually decreased with distance away from the enlarged diameter portion 53.

The fillet portion 47 is provided (in a boundary portion) between the positive pressure surface 41a and the connection surface 56a. The fillet portion 47 connects the positive pressure surface 41a of the stator vane body 41 to the enlarged diameter portion 56.

The fillet portion 47 is extended in a direction along the positive pressure surface 41a. The fillet portion 47 has the same configuration as that of the above-described fillet portion 45. Specifically, the fillet portion 47 includes end portions 45A and 45B disposed on the outside of the enlarged diameter portion 56, each of the end portions 46A and 46B has the first curved surface 45a.

The fillet portion 48 is provided (in a boundary portion) between the negative pressure surface 41b and the connection surface 56a and connects the negative pressure surface 41b of the stator vane body 41 to the enlarged diameter portion 56.

The fillet portion 48 is extended in a direction along the negative pressure surface 41b. The fillet portion 48 has the same configuration as that of the above-described fillet portion 46. Specifically, the fillet portion 48 includes the end portions 46A and 46B disposed on the outside of the enlarged diameter portion 56, each of the end portions 46A and 46B has the first curved surface 46a.

The curved surface portion 50A is provided on the positive pressure surface 41a adjacent to the radial end surface 41c protruding radially outward the enlarged diameter portion 53. The curved surface portion 50A is formed on a front area of the positive pressure surface 41a extending from the enlarged diameter portion 53 to the leading edge 41A.

The curved surface portion 50A includes the first curved surface 45a forming the end portion 45A and a second curved surface 41e.

The second curved surface 41e which is a part of the curved surface portion 50A is formed in a corner portion of the stator vane body 41 defining the radial end surface 41c located between the end portion 45A of the fillet portion 45 and the leading edge 41A.

The second curved surface 41e which is the part of the curved surface portion 50A reaches the end portion 45A of the fillet portion 45. The second curved surface 41e is formed so that its curvature radius is smaller than that of the first curved surface 45a, and the curvature radius of the second curved surface 41e is gradually decreased with distance away from the end portion 45A toward the leading edge 41A.

Accordingly, the curved surface portion 50A is formed so that its curvature radius is gradually decreased with distance away from the enlarged diameter portion 53 toward the leading edge 41A.

The curved surface portion 50B is provided on the positive pressure surface 41a adjacent to the radial end surface 41c protruding radially outward from a circumference of the enlarged diameter portion 53. The curved surface portion 50B is formed on a rear area of the positive pressure surface 41a extending from the enlarged diameter portion 53 to the trailing edge 41B.

The curved surface portion 50B includes the first curved surface 45a forming the end portion 45B and the second curved surface 41e.

The second curved surface 41e which is a part of the curved surface portion 50B is formed in a corner portion of the stator vane body 41 that defines the radial end surface 41c located between the end portion 45B of the fillet portion 45 and the trailing edge 41B.

The second curved surface 41e which is the part of the curved surface portion 50B reaches the end portion 45B of the fillet portion 45. The second curved surface 41e is formed so that its curvature radius is smaller than that of the first curved surface 45a, and the curvature radius of the second curved surface 41e is gradually decreased with distance away from the end portion 45B toward the trailing edge 41B.

Accordingly, the curved surface portion 50B is formed so that its curvature radius is gradually decreased with distance away from the enlarged diameter portion 53 toward the trailing edge 41B.

The curved surface portion 50C is provided on the negative pressure surface 41b adjacent to the radial end surface 41c protruding radially outward from the circumference of the enlarged diameter portion 53. The curved surface portion 50C is formed on a front area of the negative pressure surface 41b extending from the enlarged diameter portion 53 to the leading edge 41A.

The curved surface portion 50C includes the first curved surface 46a forming the end portion 46A and a second curved surface 41f.

The second curved surface 41f which is a part of the curved surface portion 50C is formed in a corner portion of the stator vane body 41 that defines the radial end surface 41c located between the end portion 46A of the fillet portion 46 and the leading edge 41A.

The second curved surface 41f which is the part of the curved surface portion 50C reaches the end portion 46A of the fillet portion 46. The second curved surface 41f is formed so that its curvature radius is smaller than that of the first curved surface 46a, and the curvature radius of the second curved surface 41e is gradually decreased with distance away from the end portion 46A toward the leading edge 41A.

Accordingly, the curved surface portion 50C is formed so that its curvature radius is gradually decreased with distance away from the enlarged diameter portion 53 toward the leading edge 41A.

The curved surface portion 50D is provided on the negative pressure surface 41b adjacent to the radial end surface 41c protruding radially outward from the circumference of the enlarged diameter portion 53. The curved surface portion 50D is formed on a rear area of the negative pressure surface 41b extending from the enlarged diameter portion 53 to the trailing edge 41B.

The curved surface portion 50D includes the first curved surface 46a forming the end portion 46B and the second curved surface 41f.

The second curved surface 41f which is a part of the curved surface portion 50D is formed in a corner portion of the stator vane body 41 that defines the radial end surface 41c located between the end portion 46B of the fillet portion 46 and the trailing edge 41B.

The second curved surface 41f which is the part of the curved surface portion 50D reaches the end portion 46B of the fillet portion 46. The second curved surface 41f is formed so that its curvature radius is smaller than that of the first curved surface 46a, and the curvature radius of the second curved surface 41f is gradually decreased with distance away from the end portion 46B toward the trailing edge 41B.

Accordingly, the curved surface portion 50D is formed so that its curvature radius is gradually decreased with distance away from the enlarged diameter portion 53 toward the trailing edge 41B.

Since the variable stator vane 35 is provided with the curved surface portions 50A to 50D, the disturbance of the flow of the working fluid in the vicinity of the radial end surface 41c of the stator vane body 41 can be suppressed by the curved surface portions 50A to 50D disposed close to the enlarged diameter portion 53 in which a large pressure difference between the positive pressure surface 41a and the negative pressure surface 41b is generated.

Further, since the curvature radius of each of the curved surface portions 50A to 50D is gradually decreased with distance away from the enlarged diameter portion 53, it is possible to allow the working fluid on the exit side of the variable stator vane 35 to smoothly flow along the curved surface portions 50A to 50D while preventing an increase in amount of the leakage flow occurred in the vicinity of the rotation shaft 43.

Thus, since the variable stator vane 35 is provided with the curved surface portions 50A to 50D, an occurrence of pressure loss in the vicinity of the radial end surface 41c of the stator vane body 41 can be suppressed while preventing an increase in amount of the leakage flow.

The curved surface portion 51A is provided on the positive pressure surface 41a adjacent to the radial end surface 41d protruding radially outward from a circumference of the enlarged diameter portion 56. The curved surface portion 51A is formed on a front area of the positive pressure surface 41a extending from the enlarged diameter portion 56 to the leading edge 41A.

The curved surface portion 51A has the same formation as that of the above-described curved surface portion 50A. That is, the curved surface portion 51A includes the first curved surface 45a forming the end portion 45A and the second curved surface 41e.

The curved surface portion 51A is formed so that its curvature radius is gradually decreased with distance away from the enlarged diameter portion 56 toward the leading edge 41A.

The curved surface portion 51B is provided on the positive pressure surface 41a adjacent to the radial end surface 41d protruding radially outward from the circumference of the enlarged diameter portion 56. The curved surface portion 51B is formed on a rear area of the positive pressure surface 41a extending from the enlarged diameter portion 56 to the trailing edge 41B.

The curved surface portion 51B has the same formation as that of the above-described curved surface portion 50B. That is, the curved surface portion 51B includes the first curved surface 45a forming the end portion 45B and the second curved surface 41e.

The curved surface portion 51B is formed so that its curvature radius is gradually decreased with distance away from the enlarged diameter portion 56 toward the trailing edge 41B.

The curved surface portion 51C is provided on the negative pressure surface 41b adjacent to the radial end surface 41d protruding radially outward from the circumference of the enlarged diameter portion 56. The curved surface portion 51C is formed on a front area of the negative pressure surface 41b extending from the enlarged diameter portion 56 to the leading edge 41A.

The curved surface portion 51C has the same formation as that of the above-described curved surface portion 50C. That is, the curved surface portion 51C includes the first curved surface 46a forming the end portion 46A and the second curved surface 41f.

The curved surface portion 51C is formed so that its curvature radius is gradually decreased with distance away from the enlarged diameter portion 56 toward the leading edge 41A.

The curved surface portion 51D is provided on the negative pressure surface 41b adjacent to the radial end surface 41d protruding radially outward from the circumference of the enlarged diameter portion 56. The curved surface portion 51D is formed on a rear area of the negative pressure surface 41b extending from the enlarged diameter portion 56 to the trailing edge 41B.

The curved surface portion 51D has the same formation as that of the above-described curved surface portion 50D. That is, the curved surface portion 51D includes the first curved surface 46a forming the end portion 46B and the second curved surface 41f.

The curved surface portion 51D is formed so that its curvature radius is gradually decreased with distance away from the enlarged diameter portion 56 toward the trailing edge 41B.

Since the variable stator vane 35 is provided with the curved surface portions 51A to 51D, the disturbance of the flow of the working fluid in the vicinity of the radial end surface 41d of the stator vane body 41 can be suppressed by the curved surface portions 51A to 51D disposed close to the enlarged diameter portion 56 in which a large pressure difference between the positive pressure surface 41a and the negative pressure surface 41b is generated.

Further, since the curvature radius of each of the curved surface portions 51A to 51D is gradually decreased with distance away from the enlarged diameter portion 56, it is possible to allow the working fluid on the exit side of the variable stator vane 35 to smoothly flow along the curved surface portions 51A to 51D while preventing an increase in amount of the leakage flow occurred in the vicinity of the rotation shaft 44.

Thus, since the variable stator vane 35 is provided with the curved surface portions 51A to 51D, an occurrence of pressure loss in the vicinity of the radial end surface 41d of the stator vane body 41 can be suppressed while preventing an increase in amount of the leakage flow.

Additionally, in FIG. 1, a case in which four variable stator vane mechanisms 15 are provided in the direction of the axis $O_1$ has been described as an example, but the number of the variable stator vane mechanisms 15 arranged in the direction of the axis $O_1$ may be one or more and is not limited to one.

The plurality of stator vane rows 17 are arranged at predetermined intervals close to the discharge side of the arrangement area of the plurality of variable stator vane mechanisms 15. Each stator vane row 17 includes a plurality of stator vanes 58 fixed in the circumferential direction of the inner surface of the outer casing 26. Each of the plurality of stator vanes 58 includes a stator vane body 59. The stator vane 58 is disposed in the flow path 27 and is disposed between the rotor blades 23 in the direction of the axis $O_1$.

The stator vanes 58 constituting the plurality of stator vane rows 17 are formed so that the angles of the plurality of stator vane bodies 59 with respect to the flow direction of the main stream of the working fluid cannot be changed.

According to the variable stator vane 35 of the first embodiment, since the curved surface portions 50A to 50D are provided close to the radial end surface 41c of the stator vane body 41, the disturbance of the flow of the working fluid in the vicinity of the radial end surface 41c of the stator vane body 41 can be suppressed by the curved surface portions 50A to 50D disposed close to the enlarged diameter portion 53 in which a large pressure difference between the positive pressure surface 41a and the negative pressure surface 41b is generated.

Further, since the curvature radius of each of the curved surface portions 50A to 50D is gradually decreased with distance away from the enlarged diameter portion 53, an occurrence of pressure loss in the vicinity of the radial end surface 41c of the stator vane body 41 can be suppressed while preventing an increase in amount of the leakage flow.

Further, since the curved surface portions 51A to 51D are provided close to the radial end surface 41d of the stator vane body 41, the disturbance of the flow of the working fluid in the vicinity of the radial end surface 41d of the stator vane body 41 can be suppressed by the curved surface portions 51A to 51D disposed close to the enlarged diameter portion 56 in which a large pressure difference between the positive pressure surface 41a and the negative pressure surface 41b is generated.

Further, since the curvature radius of each of the curved surface portions 51A to 51D is gradually decreased with distance away from the enlarged diameter portion 56, an occurrence of pressure loss in the vicinity of the radial end surface 41d of the stator vane body 41 can be suppressed while preventing an increase in amount of the leakage flow.

Additionally, in the first embodiment, a case in which four curved surface portions (the curved surface portions 50A to 50D) are provided close to the radial end surface 41c of the stator vane body 41 has been described as an example. However, at least one curved surface portion of the curved surface portions 50A to 50D is provided close to the radial end surface 41c of the stator vane body 41, an occurrence of pressure loss in the vicinity of the radial end surface 41c can be suppressed while preventing an increase in amount of the leakage flow.

Further, in the first embodiment, a case in which four curved surface portions (the curved surface portions 51A to 51D) are provided close to the radial end surface 41d of the stator vane body 41 has been described as an example. However, at least one curved surface portion of the curved surface portions 51A to 51D is provided close to the radial end surface 41d of the stator vane body 41, an occurrence of pressure loss in the vicinity of the radial end surface 41d can be suppressed while preventing an increase in amount of the leakage flow.

Further, in the first embodiment, a case in which the curved surface portions (the curved surface portions 50A to 510D and 51A to 51D) are provided close to both of the positive pressure surface 41a and the negative pressure surface 41b has been described as an example. However, for example, only the positive pressure surface 41a may be provided with the curved surface portions (specifically, the curved surface portions 50A and 50B or the curved surface portions 50A, 50B, 51A, and 51B) or only the negative pressure surface 41b may be provided with the curved surface portions (specifically, the curved surface portions 50C and 50D or the curved surface portions 50C, 50D, 51C, and 51D).

Second Embodiment

Figure 10:
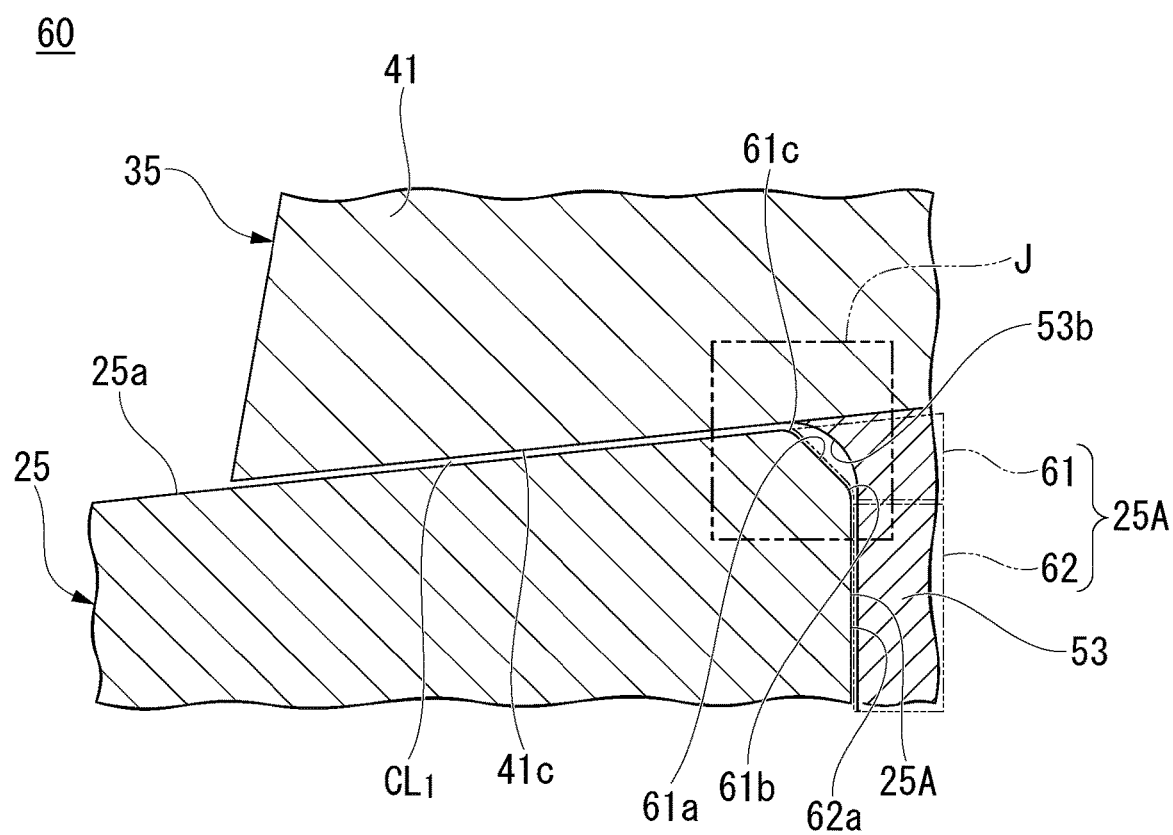
FIG. 10 is an enlarged cross-sectional view of a main part of a compressor according to a second embodiment of the present invention and is a cross-sectional view showing a boundary portion between an inner casing and a variable stator vane.
Figure 11:
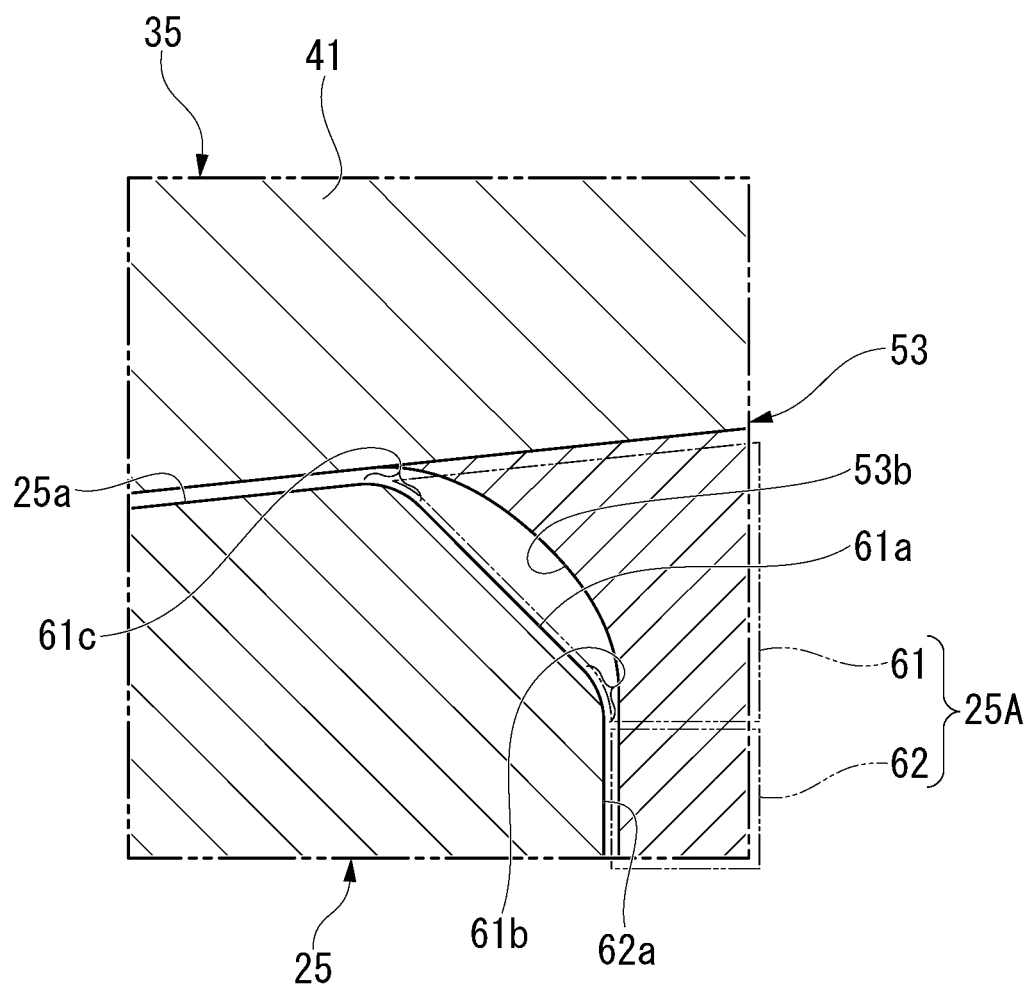
FIG. 11 is an enlarged cross-sectional view of a part surrounded by an area J of a structure shown in FIG. 10.

A compressor 60 of a second embodiment will be described with reference to FIG. 10 and FIG. 11. In FIG. 10, the same components as those of the structure shown in FIG. 1 to FIG. 3 are denoted by the same reference numerals. In FIG. 11, the same components as those of the structure shown in FIG. 10 are denoted by the same reference numerals.

Additionally, although not shown in FIG. 10 and FIG. 11, the compressor 60 of the second embodiment includes curved surface portions 50A to 50D and 51A to 51D constituting the compressor 10 of the first embodiment.

The compressor 60 of the second embodiment has the same configuration as that of the compressor 10 except that the shaft housing 25A and the enlarged diameter portion 53 constituting the compressor 10 of the first embodiment have a different shape.

The shaft housing 25A includes a first portion 61 which is exposed from the outer peripheral surface 25a of the inner casing 25, and a second portion 62 which is integrally formed with the first portion 61. The second portion 62 is disposed at a position away from the outer peripheral surface 25a.

The enlarged diameter portion 53 includes a recessed curved surface 53b facing the first portion 61.

The first portion 61 is shaped such that a diameter of the first portion 61 is increased from the second portion 62 toward the outer peripheral surface 25a. The first portion 61 includes an inclined surface 61a, a first chamfered portion 61b, and a second chamfered portion 61c.

The inclined surface 61a is inclined at a certain angle. The first chamfered portion 61b is formed between the inclined surface 61a and the inner peripheral surface 62a of the second portion 62. The first chamfered portion 61b protrudes in a direction toward the curved surface 53b.

The second chamfered portion 61c is formed between the outer peripheral surface 25a of the inner casing 25 and the inclined surface 61a. The second chamfered portion 61c is protruded in a direction toward the curved surface 53b.

According to the compressor 60 of the second embodiment, since the curved surface 53b, the inclined surface 61a, the first chamfered portion 61b, and the second chamfered portion 61c described above are provided, a gap formed between the end of the curved surface 53b and the first and second chamfered portions 61b and 61c can be reduced. Accordingly, a leakage flow from being occurred between the inner casing 25 and the curved surface 53b can be suppressed.

Additionally, in the second embodiment, a case in which the enlarged diameter portion 53 is provided with the curved surface 53b and the inner casing 25 is provided with the inclined surface 61a, the first chamfered portion 61b, and the second chamfered portion 61c has been described as an example. However, for example, the enlarged diameter portion 56 may be provided with the curved surface 53b and the outer casing 26 may be provided with the inclined surface 61a, the first chamfered portion 61b, and the second chamfered portion 61c.

Although preferred embodiments of the present invention have been described above, the present invention is not limited to such specific embodiments and can be modified and changed into various forms within the scope of the spirit of the present invention described in claims.

INDUSTRIAL APPLICABILITY

The present invention can be applied to the variable stator vane and the compressor.

REFERENCE SIGNS LIST 10, 60 Compressor
11 Rotor
13 Casing
15 Variable stator vane mechanism
17 Stator vane row
21 Rotor body
23 Rotor blade
23A First rotor blade row
23B Second rotor blade row
23C Third rotor blade row
23D Fourth rotor blade row
23E Fifth rotor blade row
23F Sixth rotor blade row
25 Inner casing
25a Outer peripheral surface
25A, 26A Shaft housing
26 Outer casing
26a Inner peripheral surface
27 Flow path
28 Suction port
31 Movable ring
33 Mechanical linkage
35 Variable stator vane
37 Rotational drive unit
41, 59 Stator vane body
41a Positive pressure surface 41A Leading edge
41AA Leading edge side portion
41ab Vane surface
41b Negative pressure surface
41B Trailing edge
41BB Trailing edge side portion
41c, 41d Radial end surface
41e, 41f Second curved surface
43, 44 Rotation shaft
45 to 48 Fillet portion
45a, 46a First curved surface
45A, 45B, 46A, 46B End portion
50A to 50D, 51A to 51D Curved surface portion
52, 55 Rotation shaft body
53, 56 Enlarged diameter portion
53a, 56a Connection surface
53b Curved surface
58 Stator vane
61 First portion
61a Inclined surface
61b First chamfered portion
61c Second chamfered portion
62 Second portion
62a Inner peripheral surface
$CL_1$, $CL_2$ Clearance
S Direction
$O_1$, $O_2$ Axis

The invention claimed is:

1. A variable stator vane comprising:
a stator vane body which is disposed in a flow path allowing a working fluid to flow therethrough and which includes a vane surface connecting two edges and a radial end surface forming a clearance between the radial end surface and a peripheral surface of a casing;
a first rotation shaft which is rotatable so that an angle of the stator vane body with respect to a flow direction of a main stream of the working fluid is varied and which is connected to the radial end surface of the stator vane body; and
a curved surface portion which is formed on the vane surface adjacent to the radial end surface, an end portion of the curved surface protruding outward from a circumference of the first rotation shaft toward the edge of the stator vane,
wherein a curvature radius of the curved surface portion in a cross-sectional view in a direction from the edge toward the first rotation shaft is gradually decreased with distance away from the first rotation shaft toward the edge;
wherein the first rotation shaft includes a connection surface to which the radial end surface is connected,
a fillet portion, which connects the stator vane body to the first rotation shaft, is provided between the vane surface and the connection surface,
an end portion of the fillet portion is formed so as to extend outward from of the connection surface and an outer surface of the end portion of the fillet portion is as a first curved surface,
at least part of a corner portion of the stator vane body which is formed so as to define the radial end surface and located between the end portion of the fillet portion and the edge of the stator vane body is as a second curved surface reaching the end portion of the fillet portion and a curvature radius of the second curved surface in the cross-sectional view in the direction from the edge toward the first rotation shaft is smaller than that of the first curved surface, and
the curved surface portion includes the first curved surface and the second curved surface.

2. A variable stator vane according to claim 1, wherein the first curved surface is curved so as to be convex in a direction away from the vane surface in the cross-sectional view in the direction from the edge toward the first rotation shaft.

3. A variable stator vane according to claim 2, the curvature radius of the first curved surface in the cross-sectional view in the direction from the edge toward the first rotation shaft is gradually increased with distance away from the first rotation shaft in an axial direction of the first rotation shaft.

4. The variable stator vane according to claim 1, wherein the vane surface includes a negative pressure surface and a positive pressure surface, and
the curved surface portion is formed close to the negative pressure surface.

5. The variable stator blade according to claim 1, wherein the vane surface includes a negative pressure surface and a positive pressure surface, and
the curved surface portion is formed close to the positive pressure surface.

6. The variable stator blade according to claim 1, wherein the vane surface includes a negative pressure surface and a positive pressure surface, and
the curved surface portion is formed close to each of the negative pressure surface and the positive pressure surface.

7. The variable stator vane according to claim 1, wherein the casing is provided with a shaft housing which is exposed from the peripheral surface of the casing and within which the first rotation shaft is accommodated,
the shaft housing includes a first portion which is exposed from the peripheral surface, and a second portion which is integrally formed with the first portion and which is disposed at a position further away from the peripheral surface than the first portion,
the first rotation shaft includes a recessed curved surface facing the first portion,
the first portion is shaped such that a diameter of the first portion is increased from the second portion toward the peripheral surface of the casing, and
the first portion includes an inclined surface which is inclined at a certain angle, a first chamfered portion which is formed between the inclined surface and an inner peripheral surface of the second portion and which is convex in a direction toward the recessed curved surface, and a second chamfered portion which is formed between the peripheral surface and the inclined surface and which is convex in a direction toward the recessed curved surface.

8. A compressor comprising:
the variable stator vane according to claim 1;
a rotor including a rotor body and a plurality of rotor blades arranged in an axial direction and a circumferential direction of the rotor body;
an inner casing which is provided on the outside of the rotor;
an outer casing which is provided on the outside of the inner casing; and
a rotational drive unit which is connected to the first rotation shaft and configured to rotate the first rotation shaft,
wherein the casing is at least one of the inner casing and the outer casing.

9. The compressor according to claim 8, wherein the first rotation shaft is supported by the inner casing so as to be rotatable, and the variable stator vane further comprises a second rotation shaft which is connected to the stator vane body located opposite to the first rotation shaft and which is supported by the outer casing so as to be rotatable.

10. The compressor according to claim 9, wherein the curved surface portion is also disposed on the vane surface located close to the second rotation shaft.

11. A variable stator vane according to claim 1, wherein the first rotation shaft includes a rotation shaft body and an enlarged diameter portion, and the enlarged diameter portion is connected to the radial end surface of the stator vane body.

* * * * *